Dec. 23, 1941.  F. W. COTTERMAN  2,266,740
VACUUM CONTROLLED AUTOMOTIVE TRANSMISSION GEAR
Filed June 9, 1938   3 Sheets-Sheet 1
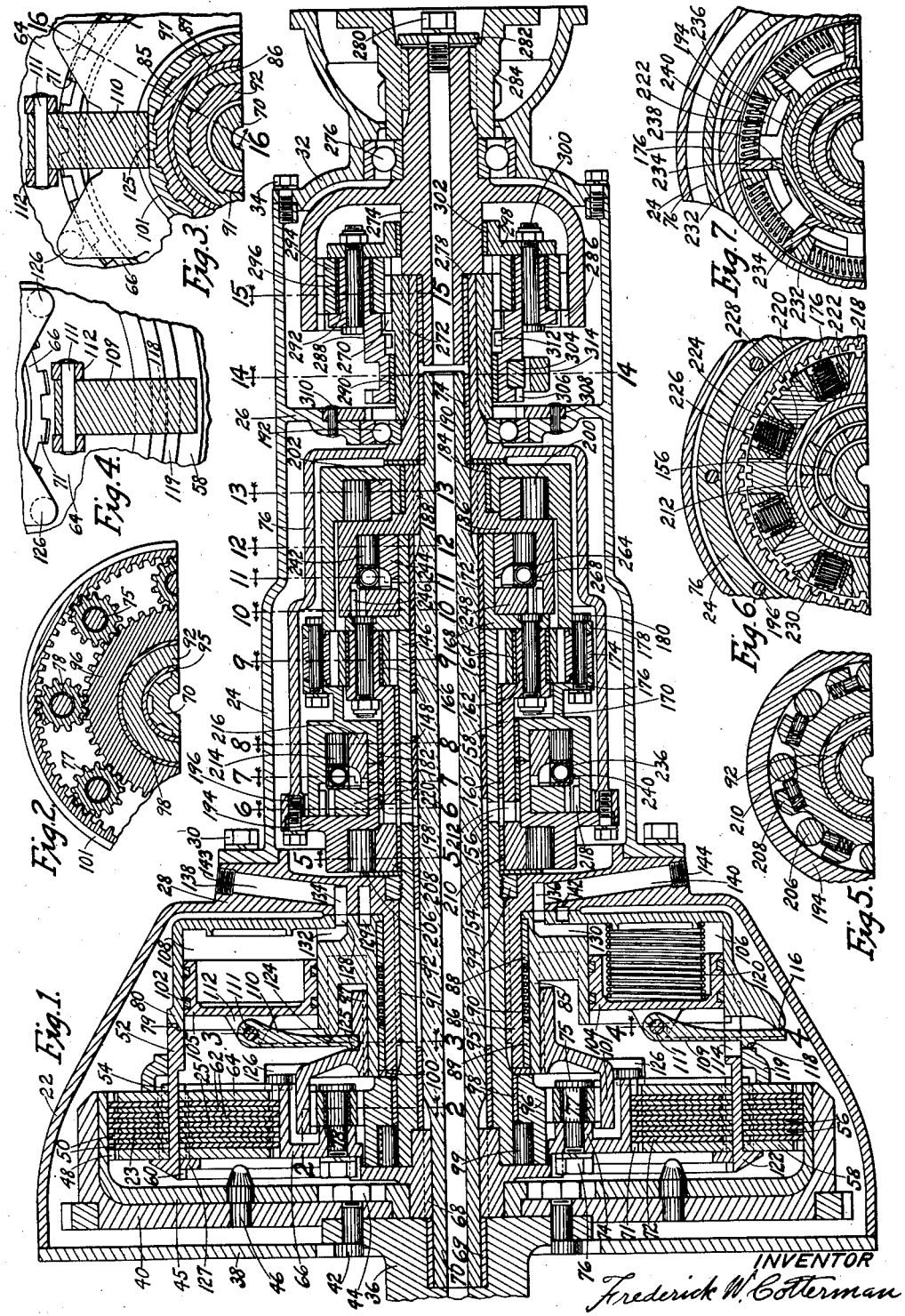
INVENTOR
*Frederick W. Cotterman*

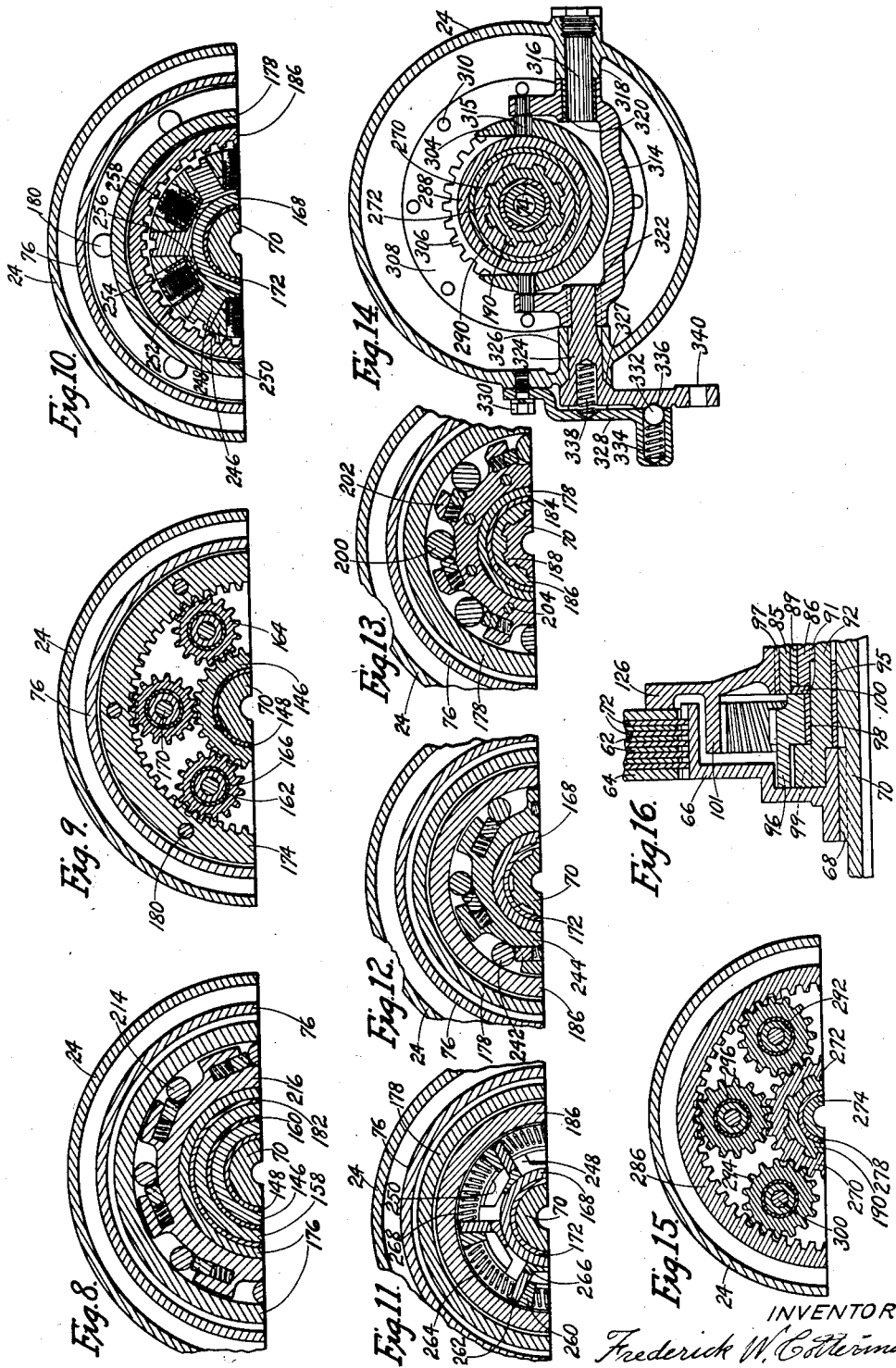

Dec. 23, 1941.  F. W. COTTERMAN  2,266,740
VACUUM CONTROLLED AUTOMOTIVE TRANSMISSION GEAR
Filed June 9, 1938  3 Sheets-Sheet 3
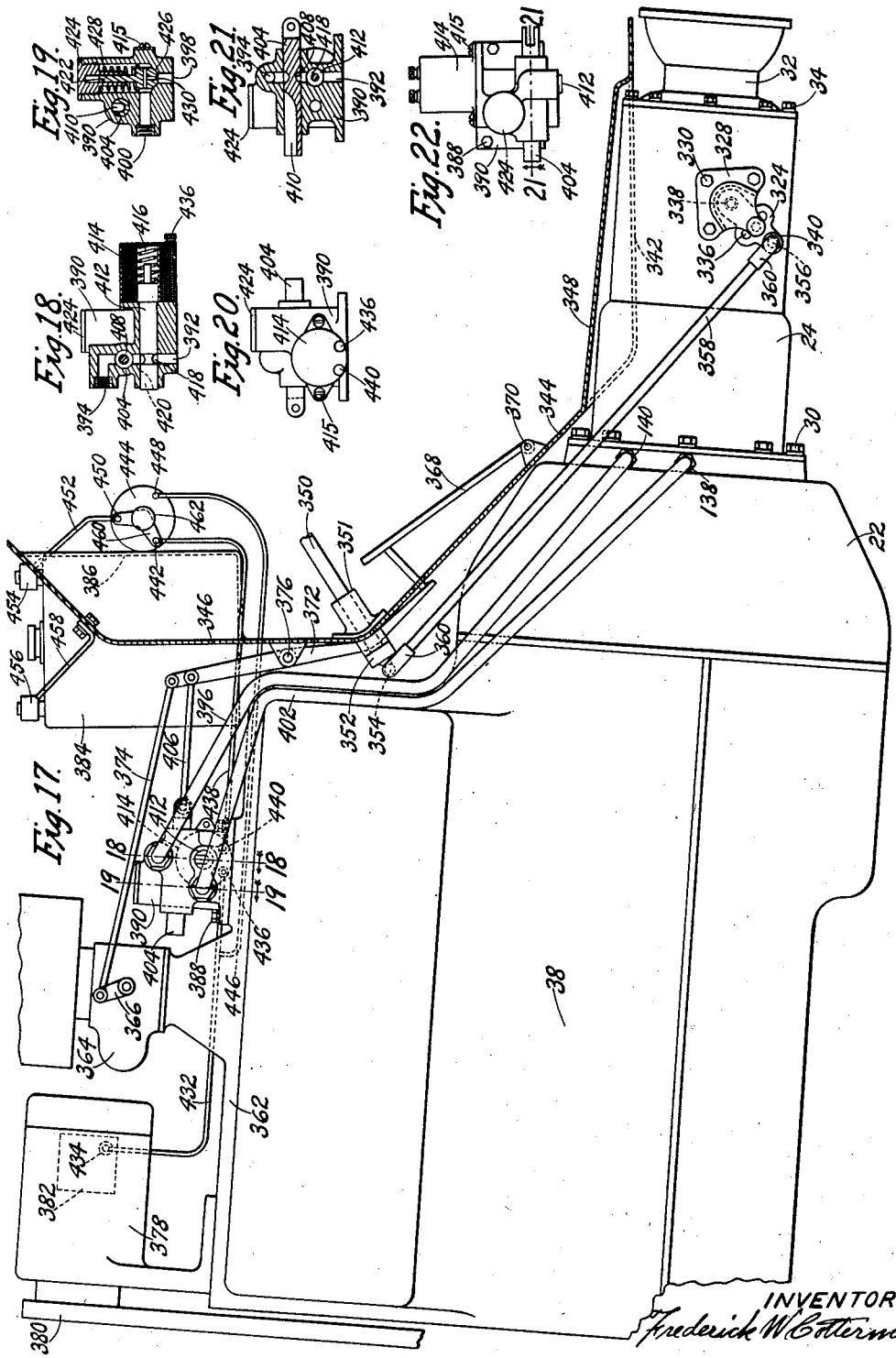
INVENTOR
Frederick W. Cotterman Patented Dec. 23, 1941

2,266,740

UNITED STATES PATENT OFFICE 2,266,740

VACUUM CONTROLLED AUTOMOTIVE TRANSMISSION GEAR

Frederick W. Cotterman, Dayton, Ohio, assignor of one-half to Bessie D. Apple, Dayton, Ohio Application June 9, 1938, Serial No. 212,719

20 Claims. (Cl. 192—.01)

This invention relates to power transmission mechanism and is particularly applicable to automotive use.

An object of the invention is to provide an automatic transmission mechanism having four forward speed ratios, namely, low, second, high, and overdrive, together with automatic no back mechanism and a manually operable reversing gear all within the space now required for a hand shift gear-set with an overdrive.

Another object is to provide in a transmission mechanism of this character, two forward ratio gear sets adapted to be operated in series, the main set which may be called the transmission gear providing an underdrive ratio, a direct drive ratio, and an overdrive ratio, with mechanism responsive largely to speed for changing from one ratio to another, the other set being in the nature of a booster gear comprising means largely responsive to the sudden application of heavy load to shift from its direct drive ratio to its underdrive ratio, to the end that, whatever ratio may be in effect in the transmission gear, a desire for rapid acceleration from the speed then in effect to a higher speed, evidenced by a very considerable depression of the accelerator pedal by the operator, will ordinarily draw the booster gear in series with the transmission gear, and thereby produce an overall ratio which will be one step lower than the ratio then in effect in the transmission gear, unless the engine speed is at that time already too high to benefit by an increase in the overall ratio between the engine and vehicle wheels.

Another object is to provide in combination with a transmission mechanism of this character, a main clutch for connecting the engine to the transmission gear through the booster gear, and an auxiliary clutch adapted to cooperate with the main clutch and engageable for connecting the engine to the transmission gear without transmission of power through the booster gear, both clutches being operable by manifold vacuum, with means whereby the main clutch is operative to be disengaged by vacuum when the accelerator pedal is released at low vehicle speed, and the auxiliary clutch is maintained in engagement by manifold vacuum and is operative to disengage only upon heavy accelerator depression and the resulting lack of vacuum in the manifold.

Another object is to provide, in connection with the auxiliary clutch, means operative by the torque load being transmitted by the booster gear to hold the clutch fully disengaged as long as the said torque is considerable and the engine speed not excessive and the resulting manifold vacuum not too high.

Another object is to provide, for the booster gear, a single planetary gear set comprising a ring gear, a sun gear, and planet pinions on a carrier and in mesh with both said gears, said carrier being connected to the transmission gear, with means whereby the main clutch connects the engine to the ring gear, means to prevent the sun gear rotating backwardly and means whereby the auxiliary clutch connects the ring gear to the planet pinion carrier, to the end that when the main clutch engages, the engine will be connected to the transmission gear through the booster gear, and when the auxiliary clutch engages additionally, without disengaging the main clutch, the drive will be from the engine to the transmission gear without transmitting power through the booster gear.

Another object is to provide for the transmission gear, a single planetary gear-set comprising a ring gear, a sun gear, and planet pinions on a carrier and in mesh with both said gears, with means to hold the sun gear positively and permanently connected to the housing to prevent its rotation whereby it is held against backward rotation for underdrive and against forward rotation for overdrive together with means to effect direct drive through the gear mechanism without releasing the sun gear from its permanent connection.

Another object is to so construct and arrange and to so connect the several elements of the transmission gear that it normally provides an underdrive ratio but by automatically drivably connecting two of the elements together without making or unmaking any other connection, a direct drive will result, and by subsequently automatically making one additional connection only, without unmaking any connection previously made, an overdrive will result.

Another object is to place the reversing gear rearward of the transmission gear in order that no rearward rotation of any part in the transmission gear will ever be required, then so arranging the connections of the transmission gear that no part of it may rotate backwardly, to the end that a no-back condition will exist whereby the vehicle may not move rearwardly except when the reverse connection is in effect in the reversing gear.

Another object is to so construct the entire mechanism that it is normally non-free-wheeling except at speeds below ten or twelve miles per hour, then providing a simple switch on the instrument panel which may be operated to provide full free wheeling if it is desired.

Other objects and advantages will become apparent as the invention is described in detail and reference is made to the drawings, wherein:

Fig. 1 is a vertical axial section through the entire transmission mechanism.

Fig. 2 is a fragmentary transverse section, taken at 2—2 of Fig. 1, through the booster gear.

Fig. 3 is a fragmentary transverse section, taken at 3—3 of Fig. 1, through an auxiliary clutch operating lever.

Fig. 4 is a fragmentary transverse section, taken at 4—4 of Fig. 1, through a main clutch operating lever.

Fig. 5 is a partial transverse section, taken at 5—5 of Fig. 1, through a roller clutch by which the planet pinion carrier of the transmission gear may drive the output member forwardly.

Fig. 6 is a partial transverse section, taken at 6—6 of Fig. 1, through a centrifugal mechanism of the transmission gear provided for changing from underdrive to direct drive ratio.

Fig. 7 is a partial transverse section, taken at 7—7 of Fig. 1, through an unlocking mechanism which operates to allow the centrifugal mechanism of Fig. 6 to act.

Fig. 8 is a partial transverse section, taken at 8—8 of Fig. 1, through a roller clutch by which the output member of the transmission gear may drive the ring gear forwardly to prevent free wheeling, thereby bringing said output member and said ring gear to the same speed and simultaneously operating the unlocking mechanism of Fig. 7 whereby the centrifugal mechanism of Fig. 6 connects said output member and said ring gear only when they start rotating at the same speed.

Fig. 9 is a partial transverse section, taken at 9—9 of Fig. 1, through the toothed gearing of the transmission gear.

Fig. 10 is a partial transverse section, taken at 10—10 of Fig. 1, through a centrifugal mechanism of the transmission gear provided for changing from direct drive to overdrive ratio.

Fig. 11 is a partial transverse section, taken at 11—11 of Fig. 1, through an unlocking mechanism which operates to allow the centrifugal mechanism of Fig. 10 to act.

Fig. 12 is a partial transverse section, taken at 12—12 of Fig. 1, through a roller clutch by which the planet pinion carrier of the transmission gear may drive the main shaft, which is the input member of the transmission gear, forwardly to prevent free wheeling, thereby bringing said carrier and main shaft to the same speed and simultaneously operating the unlocking mechanism of Fig. 11, whereby the centrifugal mechanism of Fig. 10 connects said carrier and main shaft only when they start rotating at the same speed.

Fig. 13 is a partial transverse section, taken at 13—13 of Fig. 1, through a roller clutch by which the main shaft or input member of the transmission gear may drive the ring gear forwardly.

Fig. 14 is a transverse section, taken at 14—14 of Fig. 1, through the manually operable mechanism of the reversing gear.

Fig. 15 is a partial transverse section, taken at 15—15 of Fig. 1, through the toothed gearing of the reversing gear.

Fig. 16 is a fragmentary longitudinal section, taken at 16—16 of Fig. 3, through one of the arms provided for applying pressure to the plates of the auxiliary clutch.

Fig. 17 is a side elevation of an automotive engine with the improved transmission mechanism attached and connected to the manifold vacuum through appropriate control valve means, there being also shown a manual control for the reversing gear, the necessary connections to the accelerator pedal for controlling the vacuum operated elements, and the electrical connections to the battery through which the free wheeling switch operates.

Fig. 18 is a transverse section through the vacuum control valve mechanism taken at 18—18 of Fig. 17.

Fig. 19 is a transverse section through the vacuum control valve mechanism taken at 19—19 of Fig. 17.

Fig. 20 is a side elevation of the vacuum control valve mechanism taken from the side opposite that from which Fig. 17 is taken.

Fig. 21 is a longitudinal section taken at 21—21 of Fig. 22.

Fig. 22 is a top plan view of the control valve mechanism.

Similar numerals refer to similar parts throughout the several views.

Construction

The transmission mechanism comprises a clutch housing 22 containing a main clutch 23, an auxiliary clutch 25, and a planetary gear-set through which speed is reduced and torque is multiplied whenever the auxiliary clutch is disengaged. The forward end of the smaller housing 24 contains a second planetary gear-set with mechanism to connect it in several ways to provide underdrive, direct drive and overdrive, while the rearward end contains a third planetary gear-set for reversing the direction of rotation.

To facilitate description, the forward gear-set is hereinafter called the booster gear, the middle gear-set the transmission gear, and the rearward gear-set the reversing gear. A partition 26 separates the reversing gear from the transmission gear while the rear end wall 28 of the clutch housing 22 separates the transmission gear from the booster gear. The smaller housing is secured to the clutch housing by the screws 30. A rear bearing head 32 is secured to the rear end of the housing 24 by the screws 34.

Within the clutch housing 22 the crank shaft 36 of the engine 38 carries the flywheel 40 secured thereto by the bolts 42 and nuts 44. The clutch driving element 45 is closely fitted to the inside of the flywheel and is driven thereby through the drive pins 46 which are fast to the flywheel and slidably fitted into holes in the driving element. The driving element has internal splines 48. A series of clutch plates 50 are externally notched to fit these splines slidably.

The intermediate clutch element 52 has external splines 54. A series of clutch plates 56 are internally notched to fit these splines slidably. The two outer plates 58 are thicker than the plates 56, but are otherwise identical therewith.

Clutch element 52 has internal splines 60. A series of clutch plates 62 are externally notched to fit these splines slidably. The two outer plates 64 are thicker than the plates 62 but are otherwise identical therewith.

The driven clutch element 66 is secured by splines 68 to the main shaft 70 to rotate therewith. The main shaft 70 is rotatable in the end of the crank shaft 36 in a bearing bushing 69. Around the periphery of element 66 it has the external splines 71. A series of clutch plates 72 are internally notched to fit these splines slidably.

Driven element 66 has a series of rearwardly extending hubs 74 each carrying a stud 75 held in place by a nut 76. Studs 75 rotatably support the planet pinions 77 which are provided with bearing bushings 78.

The intermediate clutch element 52 is concentrically supported at 79 in the clutch operating member 80 and is secured thereto by screws (not shown). The hub 85 of member 80 is freely rotatable on the stationary hub 86 of the clutch housing 22. Rotatable hub 85 is provided with a press fitted bearing bushing 88 while a second bearing bushing 89 is press fitted over the stationary hub 86. A light spring 90 in compression between bushings 88 and 89 always urges the clutch operating member rearwardly.

The stationary hub 86 has internal splines 91 into which the external splines of a sleeve 92 are closely fitted. The sleeve 92 is held in place by the nut 94. A bearing bushing 95 is press fitted into sleeve 92 to rotatably support the main shaft 70.

Near the forward end of the sleeve 92, a sun gear 96 is rotatable on the bearing bushing 98. A roller brake 99 allows the sun gear to rotate forwardly but not backwardly, by backwardly being meant counterclockwise when viewed from the left of the drawing. The sun gear 96 is in constant mesh with the planet pinions 77. A washer 100 limits axial movement of the sun gear.

The hub 85 of the clutch operating member 80 has external splines 97 which slidably receive the internal splines of a ring gear 101 which is in constant mesh with the planet pinions 77.

The clutch operating member 80 carries six equally spaced cylinders, each provided with a piston having expansion rings 102. Three of these pistons are adapted to control the main clutch 23 while the remaining three control the auxiliary clutch 25 and although the pistons are all alike, it will facilitate description if the three which operate the main clutch carry the numeral 104, while the three which operate the auxiliary clutch carry the numeral 105. Similarly the three cylinders containing the pistons 104 may be numbered 106 while those containing the pistons 105 may be numbered 108. The three pistons 104 which control the main clutch are provided with levers 109 while the three pistons 105 which control the auxiliary clutch are provided with the levers 110, both levers being hinged to the pistons by the pins 111 passing through the ears 112 carried by the pistons.

Levers 109 extend through slots 114 in intermediate clutch element 52 and are fulcrumed on the member 80 at 116, the point of power application being at the pin 111 and the resulting pressure at the lugs 118. The lugs 118 bear on a ring 119 which in turn bears on one of the heavy outer clutch plates 58. Springs 120 urge the pistons forwardly to maintain engagement of the main clutch 23. An outwardly extending flange 122 takes the reaction of the clutch engaging pressure.

Levers 110 are fulcrumed on the member 80 at 124, the point of power application being at the pin 111 and the resulting pressure at the end 125. The hub of the ring gear 101 is transversely slotted at three places to receive the three ends 125. Rearward movement of the pistons moves the ring gear forwardly.

The ring gear 101 has a series of outwardly extending arms 126 which bear against the heavy outer clutch plate 64. Rearward force applied to the pistons 105 produces a forward force on the ring gear to maintain engagement of the auxiliary clutch 25. A spring ring 127 extending into a groove in member 52 takes the reaction of the clutch engaging pressure.

The internal teeth of the ring gear 101 have their helix angle as in the right hand thread of a nut, so that when the ring gear is the driver and is under load it is forced axially rearward and therefore opposes rearward movement of the pistons 105.

In the rearward face of the clutch operating member 80 there are two annular grooves 128 and 129, the cylinders 106 being connected by passages 130 to the inner groove 129 and the cylinders 108 being connected by passages 132 to the outer groove 128.

In the forward face of the housing wall 28 are two annular grooves 134 and 136 corresponding in diameter to the grooves 128 and 129 respectively. A suction port 138 extends through the end wall into the groove 134 and a similar suction port 140 extends into the groove 136. The groove 134 is shallower at 143 to permit passage of the port 140. The outer ends of the ports 138 and 140 are tapped at 142 and 144 respectively.

Between the partition 26 and the end wall 28 in the housing 24 is the transmission gear which provides underdrive, direct drive and overdrive. The sun gear 146 has bearing bushings 148 press fitted therein, the main shaft 70 being runningly fitted in these bushings. The rear end of the nonrotatable sleeve 92 is provided with bearing bushing 154 for rotatably supporting the main shaft 70.

The sun gear 146 and the rear end of the nonrotatable sleeve 92 are end splined together at 156 whereby the sun gear 146 is positively held against rotation at all times.

The planet pinion carrier 158 is provided with a bearing bushing 160 which is rotatable on the hub of the sun gear 146. The carrier has six integral equally spaced hollow studs 162 extending rearwardly for rotatably supporting the planet pinions 164 which are in constant mesh with the sun gear 146. The planet pinions are provided with bearing bushings 166. The carrier rear bearing member 168 is secured to the carrier 158 by bolts 170. The member 168 is provided with bearing bushing 172 rotatable on the main shaft 70.

The ring gear 174 is in constant mesh with the planet pinions 164. Its front bearing member 176 and its rear bearing member 178 are secured to the ring by bolts 180. The front bearing member 176 is provided with a bearing bushing 182 rotatable on the hub of the carrier 158. The rear bearing member 178 is provided with a bearing bushing 184 rotatable on the hub of the main shaft roller clutch member 186 which is drivably connected to the main shaft by splines 188.

The output member 76 of the transmission gear-set has a rearwardly extending hub 190 rotatable in ball bearing 192 held in the partition 26, the front end being closed by the bearing head 194 secured in place by the screws 196. The bearing head 194 is provided with a bearing bushing 198 rotatable on the hub of the carrier 158.

The ring gear rear bearing member 178 forms the outer ring of a one way roller clutch 200, the inner ring 202 being secured to the main shaft roller clutch member 186 by rivets 204 (see Fig. 13), whereby the main shaft 70 can in no case rotate forwardly faster than the ring gear 174, although the ring gear may forwardly overrun the main shaft.

The output member front bearing head 194 forms the outer ring for a one way roller clutch 206, the inner ring 208 being provided with a bearing bushing 210 rotatable on the rear end of sleeve 92. The inner ring 208 and the carrier 158 are end splined together at 212. The one way roller clutch 206 is so made that the carrier 158 can in no case rotate forwardly faster than the output member 76, although the output member may forwardly overrun the carrier.

The ring gear front bearing member 176 forms the outer ring for the one way roller clutch 214, the inner ring 216 having rotative movement upon the hub of said member. The one way roller clutch 214 is so made that the output member 76 may in no case rotate forwardly faster than the ring gear, although the ring gear may forwardly overrun the output member. The member 176 is also provided at its forward end with the internal teeth 218 which are engageable by corresponding external teeth on the centrifugal weights 220.

Integral lugs 222 (see Fig. 6) extend rearwardly from the bearing head 194 filling the spaces between adjacent weights 220 and forming guides therefor. Each lug 222 is bored through radially so a thimble 224 fits it slidably. Each thimble 224 has a spring 226 which urges it radially inward. The weights have laterally extending ledges 228 upon which the inner ends of the thimbles bear. A dovetail strip 230 is driven into a corresponding groove cut axially across the outer surface of each lug 222 whereby the springs are held under stress in the thimbles.

A smaller integral lug 232 (see Fig. 7) extends rearwardly from each larger lug 222, and an equal number of integral lugs 234 extend forwardly from the inner roller clutch ring 216. Springs 236 are placed between the lugs whereby the lugs 234 are normally seated against the lugs 232.

Integral lugs 238 extend rearwardly from the weights 220 (see Fig. 7) each one radially under a lug 234, whereby the weights 220 may not be moved radially outward by centrifugal force as long as the several lugs are arranged as in Fig. 7.

Two annular cupped stampings 240 provide a housing for the springs 236, the stampings being placed with the open sides of the cups together, the side web of the front stamping being notched to allow the lugs 232 to extend rearwardly therethrough, and the side web of the rear stamping being notched to allow the lugs 234 to extend forwardly therethrough. The spring housing prevents the springs being rubbed by the member 176 which at times rotates at different speeds from the springs.

The main shaft roller clutch member 186 forms the outer ring for the one way roller clutch 242, the inner ring 244 having limited rotative movement on the hub of the carrier rear bearing member 168. The one way roller clutch 242 is so made that the carrier member 168 may in no case rotate forwardly faster than the main shaft member 186, although the main shaft member may forwardly overrun the carrier member. The member 186 is also provided with the internal teeth 246 which are engageable by corresponding external teeth on the centrifugal weights 248.

Integral lugs 250 (see Fig. 10) extend rearwardly from the carrier member 168 filling the spaces between adjacent weights 248 and forming guides therefor. Each lug 250 is bored through radially so a thimble 252 fits it slidably. Each thimble 252 has a spring 254 which urges it radially inward.

The weights have laterally extending ledges 256 upon which the inner ends of the thimbles bear. A dovetail strip 258 is driven into a corresponding groove cut axially across the outer surface of each lug 250 whereby the springs are held under stress in the thimbles.

A smaller integral lug 260 (see Fig. 11) extends rearwardly from each larger lug 250, and an equal number of integral lugs 262 extend forwardly from the inner roller clutch ring 244. Springs 264 are placed between the lugs whereby the lugs 262 are normally seated against the lugs 260.

Integral lugs 266 extend rearwardly from the weights 248 (see Fig. 11) each one radially under a lug 262, whereby the weights 248 may not be moved radially outward by centrifugal force as long as the several lugs are arranged as in Fig. 11.

Two annular cupped stampings 268 provide a housing for the springs 264, the stampings being placed with the open sides of the cups together, the side web of the front stamping being notched to allow the lugs 260 to extend rearwardly therethrough, and the side web of the rear stamping being notched to allow the lugs 262 to extend forwardly therethrough. The spring housing prevents the springs being rubbed by the member 186 which at times rotates at different speeds from the springs. That the transmission gear hereinbefore described functions as a no-back device will hereinafter appear.

The long hub 190 of the output member 76 extends rearwardly into the reversing gear compartment. The reversing sun gear 270 has internal splines 272 which fit corresponding splines on the hub. The tail shaft 274 is rotatably supported at the rear end by the ball bearing 276 held in the bearing head 32 and at the front end by the bearing bushing 278 which is press fitted in the rear end of the hub. The larger diameter of the tail shaft 274 abuts the rear end of the sun gear 270 and therefore prevents the sun gear moving axially.

The ball bearing is held on the tail shaft by the screw 280 acting through intermediate parts 282 and 284. The ring gear 286 is shown integral with the tail shaft 274 but may be made separately and permanently secured thereto.

The reversing planet pinion carrier 288 is provided interiorly with a bearing bushing 290 within which the hub of the sun gear 270 may rotate. Integral hollow studs 292 extend rearwardly to rotatably support the planet pinions 294 in constant mesh with both the sun gear 270 and ring gear 286. The pinions 294 are provided with bearing bushings 296 which are rotatable on the studs 292. A carrier rear bearing member 298 is held to the carrier 288 by the bolts 300. A bearing bushing 302 is press fitted into the member 298 and the tail shaft 274 is rotatable in the bushing.

Near the forward end the carrier 288 is grooved for the shifting collar 304. At the extreme forward end the carrier has external teeth 306 adapted to fit slidably into the internal teeth of the plate 308, the plate 308 being secured to the partition 26 by the rivets 310. The carrier has also the internal teeth 312 adapted to fit slidably over the teeth of the sun gear 270.

A forward and reverse shifting fork 314 (see Fig. 14) has two studs 315 extending radially into openings in the shifting collar 304. One side of fork 314 is swingable on the bearing stud 316 which is screwed into the hub 318 of the housing 24. A bushing 320 is press fitted into the fork and runningly fitted over the stud 316. The other side of the fork is internally splined at 322 for the external splines of the reversing lever 324, which is rotatable in the hub 326 of the housing 24.

A beveled valve like seat 327 in the outer end of the hub 326 and a correspondingly beveled shoulder on the reversing lever 324 is intended to prevent leakage of lubricant from the housing. A detent bracket 328 is held to the housing 24 by screws 330. A detent ball 332 is pressed by a detent spring 334 into seats 336 suitably positioned for forward, neutral, and reverse positions of the lever 324. A spring 338 keeps the beveled shoulder of the lever 324 against the beveled seat 327.

The lower end of the lever 324 is provided with a hub 340 to which any suitable operating means may be attached and extended to a position convenient for the operator.

In Fig. 17, the engine, the transmission mechanism, and the control means are shown assembled and in proper position with respect to the vehicle floor 342, toe board 344 and fire wall 346. Figs. 17 to 22 are drawn to a scale only half as large as Figs. 1 to 16. The engine selected for illustration is an eight cylinder V type of about ninety horsepower although the transmission mechanism is of sufficient capacity to transmit as much as one hundred and ten horsepower.

A slight rise in the floor 342 is provided at 348 in order to clear the transmission when the engine is mounted with the forward end higher than the rearward end as in present day practice.

The manual control means for operating the reversing gear, comprises a shaft 350 rotatable in bearing 351. The shaft may preferably be alongside the steering column (not shown) and have any suitable handle for rotating the shaft, preferably placed just below the steering wheel. An arm 352 extends from the lower end of the shaft at right angles to its axis and carries the ball end 354. A ball ended stud 356 is secured in the hub 340 of the lever 324, and a rod 358 having conventional ball socket ends 360 joins the two ball ends. The arm 352 should be of such length that rotation of the shaft 350 through about one tenth turn will shift the lever 324 from forward to reverse position.

On the upper surface of the intake manifold 362 of the engine 38 there is secured a conventional carburetor 364 with throttle valve operating arm 366, which is operated in the usual manner by an accelerator pedal 368 hinged to the toe board at 370 and acting through lever 372 and rod 374, the lever being fulcrumed at 376.

Forward of the carburetor and also on the top of the intake manifold is the conventional generator 378 rotatable by belt 380 and having the usual battery charging relay 382 supported thereon. The battery 384 is mounted in a pocket 386 formed by depressing the fire wall 346.

Rearward of the carburetor there is secured to the top of the manifold, by screws 388, a control valve body 390. Body 390 has one air passage extending from the interior of the manifold 362 vertically at 392 and coming out of the body laterally at 394 where there is connected to it one end of the pipe 396, and a second air passage extending from the interior of the manifold vertically at 398 and coming out of the body laterally at 400 where there is connected to it one end of the pipe 402.

The lower ends of pipes 396 and 402 are connected respectively to the suction ports 140 and 138 in the clutch housing (see Fig. 1). The ports 138 and 140 are shown in Fig. 1 as being one hundred and eighty degrees apart, but obviously they may be brought closer together if desired, and, principally for convenience in illustration, they are shown differently positioned and closer together in Fig. 17.

A plunger valve 404 is slidable longitudinally in valve body 390 by movement of the accelerator pedal 368 acting through lever 372 and rod 406. Plunger valve 404 has a half round groove 408 extending around it and a second groove 410 extending lengthwise (see Fig. 21).

A second plunger valve 412 is slidable transversely in valve body 390 by the solenoid coil 414 whenever the coil is energized sufficiently to overcome the light spring 416. The valve 412 itself acts as a solenoid core and is therefore preferably ferrous while the valve body 390 should be non ferrous. The coil 414 is energized by current passing from the generator 378 to the battery 384 whenever the generator speed is high enough to close the relay 382. Screws 415 secure the coil to the valve body. Valve 412 has a half round groove 418 extending around it and a short longitudinal groove 420.

Obviously as long as valves 404 and 412 are in the positions shown in Figs. 21 and 18, which are the positions they assume when the accelerator is released and the relay open, the passage from the interior of the manifold to the suction port 140 will be open, but if either valve 404 or 412 or both of them are moved from the positions shown, the suction port 140 will be cut off from communication with the manifold.

A poppet valve 422 (see Fig. 19) is guided in cap 424 and held on its seat 426 by spring 428. A small leakage passage 430 allows air to pass slowly when coming in at 400 and out at 398 while lifting of the valve by air pressure differential allows air to pass much more rapidly when entering at 398 and passing out at 400.

A conductor 432 connects the relay terminal 434 to the terminal 436 of the solenoid coil while a second conductor 438 connects the other terminal 440 of the solenoid coil to a terminal 442 of a switch 444. A third conductor 446 has one end electrically spliced to conductor 432 and the other end connected to a second switch terminal 448. A third switch terminal 450 is connected by conductor 452 to one battery terminal 454, the other battery terminal 456 being grounded to the fire wall 346 by a conductor 458. A switch blade 460 normally connects terminals 442 and 450 but by turning the knob 462, the blade can be made to connect terminals 450 and 448.

The switch 444 is merely schematic and should, in actual practice be replaced by a quick make and break switch mounted in a convenient position on the instrument panel.

Obviously when the switch is in the condition shown in Fig. 17, current passing from the relay to the battery must pass through the solenoid coil, but when the switch is turned to its other position, current will pass from the relay to the battery without passing through the solenoid coil.

Proportion

While the structure shown may be proportioned for use with any horsepower and vehicle weight within reason, some suggestion as to proportion for a given vehicle may preferably be given.

If the largest diameter of the housing 22 is taken as 15½ inches and the other parts are made to the same scale, the mechanism will be suitable for an engine of around 110 H. P. in a vehicle of approximately 3600 pounds weight.

The transmission gearing is 14 pitch 14 degree pressure angle and 14 degree helix angle. The ring gear has 57 teeth on a pitch diameter of 4.196 inches; the sun gear 27 teeth on a pitch diameter of 1.988 inches; and the planet pinions 15 teeth on a pitch diameter of 1.104 inches. The helix angle of the sun gear is righthand.

The underdrive ratio provided by making the ring gear the driver, the planet pinion carrier the driven, and the sun gear the reaction member, will then be $$\frac{R+S}{R}=\frac{57+27}{57}=1.474$$

input revolutions to one output revolution.

The overdrive ratio, provided by making the planet pinion carrier the driver, the ring gear the driven, and the sun gear the reaction member, will then be $$\frac{R}{R+S}=\frac{57}{57+27}=0.6784$$

input revolutions to 1 output revolution.

In the reversing gearing where quiet operation and long wear is not the prime consideration a stub tooth design is preferable for strength. The gearing is 12-14 stub tooth, 20 degree pressure angle and straight spur teeth. The ring gear has 54 teeth on a pitch diameter of 4.50 inches; the sun gear 24 teeth on a pitch diameter of 2.00 inches; and the planet pinions 15 teeth on a pitch diameter of 1.25 inches.

The reverse ratio, provided by making the sun gear the driver, the ring gear the driven, and holding the planet pinion carrier nonrotative is then $$\frac{R}{S}=\frac{54}{24}=2.25$$

input revolutions forwardly to 1 output revolution backwardly.

The booster gearing is 16 pitch, 14 degree pressure angle, 30 degree helix angle, the teeth of the sun gear being on a left hand helix. The ring gear has 72 teeth on a pitch diameter of 5.250 inches; the sun gear 48 teeth on a pitch diameter of 3.500 inches; and the planet pinions 12 teeth on a pitch diameter of 0.875 inch.

The booster gear ratio, provided by making the ring gear the driver, the planet pinion carrier the driven, and the sun gear the reaction member, will then be $$\frac{R+S}{R}=\frac{72+48}{72}=1\tfrac{2}{3} \text{ or } 1.6667 \text{ to } 1$$

When the booster gear is made effective by heavy depression of the accelerator pedal, the overall ratio through the transmission gear with the booster gear in series with it will be:

Transmission underdrive 1.474×booster 1.6667=
overall 2.46
Transmission direct drive 1×booster 1.6667=
overall 1.67
Transmission overdrive 0.6784×booster 1.6667=
overall 1.13

By using a rear axle having a 4⅔ to 1 ratio, the overall ratios, when the booster gear is operating, will be:

2.46×4⅔=11.48 to 1 engine-to-wheel ratio
1.67×4⅔= 7.79 to 1 engine-to-wheel ratio
1.13×4⅔= 5.27 to 1 engine-to-wheel ratio and when the booster gear is not operating the overall ratios will be:

1.474×4⅔=6.88 to 1 engine-to-wheel ratio
1×4⅔=4.66 to 1 engine-to-wheel ratio
0.6784×4⅔=3.16 to 1 engine-to-wheel ratio Obviously "low gear" is had when the booster gear is in effect and the transmission gear is in underdrive, the engine-to-wheel ratio then being 11.48 to 1 and overdrive is had when the booster gear is not effective and the transmission gear is in overdrive, the engine-to-wheel ratio then being 3.16 to 1.

The spring 90 should be made of $\tfrac{3}{32}$ inch round wire, coiled 2⅛ inch pitch diameter, have 8 coils, and a free height of 16 inches.

The springs 120 should be of $\tfrac{3}{32}$ inch round wire, coiled to a 1¾ inch pitch diameter, have 12 coils, and a free height of 14 inches.

The small springs 226 and 254 are exactly alike and have been assigned different numerals to facilitate description. The springs should be made of $\tfrac{3}{32}$ inch round wire, coiled $\tfrac{7}{8}$ inch pitch diameter, have 10 active coils and a free length of 2.26 inches. The tension of each spring is 2.57 pounds when brought to the length shown in the drawings.

The underdrive to direct centrifugal weights 220 will move outwardly against 2.57 pounds resistance at 880 R. P. M. and the direct to overdrive centrifugal weights 248 will move outwardly against 2.57 pounds resistance at 1316 R. P. M. If 30-inch wheels are used with the 4⅔ to 1 axle suggested, the weights 220 and 248 will move outwardly at 17 and 38 M. P. H. respectively.

The springs 264 and 236 should be such as will yield and reduce to at least half their length from the resistance of the engine to being driven against its compression and internal friction by vehicle momentum. Their dimensions may best be found by trial.

Operation

In the drawings, the entire mechanism is shown as it appears when at rest, as when the vehicle is parked. The accelerator pedal is released, the reversing gear is in neutral, the transmission gear is coupled for underdrive, the clutch springs are holding the main clutch engaged and the auxiliary clutch has no pressure applied to its plates and could not now transmit power.

Because of the inherent no-back feature, no part of the transmission gear may rotate backwardly, but the vehicle may move forwardly or rearwardly because of the uncoupled condition of the reversing gear. This is important in parking in order that the vehicle may be rolled forwardly or rearwardly when necessary without turning over the engine.

The engine may rock backwardly by carrying the booster ring gear 101 with it, thereby rotating the planet pinions 77 on their studs 75 and turning the sun gear 96 idly forward. It is desirable to allow the engine to rock backwardly to a point of least compression to lighten the load on the starter motor when starting the engine.

If the engine is now started and left to rotate at its idling speed, there will be no visible change in the mechanism discernible in Fig. 17, but the valves 404 and 412, both being open, will permit vacuum in the engine manifold 362 to operate through pipe 396 and act on pistons 104 (see Fig. 1) and thereby disengage the main clutch 23 whereupon the engine will idle without rotating any part of the transmission mechanism except the 5 clutch plates 50.

If during this time the engine is raced to warm it, the alternate movement of the accelerator will alternately open and close the valve 404 which will alternately engage and disengage the main clutch 23. Each time the main clutch thus engages, the transmission gearing will rotate forwardly, the result being that while warming the engine, the oil in the several parts of the transmission also will be limbered up.

Now by rotating the manual reversing shaft 350, the reversing gear may be set for forward or rearward vehicle movement. To set for rearward movement the rod 358 is made to push the hub 340 of the lever 324 rearwardly, which draws the carrier 288 forwardly and engages the carrier clutch teeth 306 with the internal teeth of the clutch plate 308. When the carrier 288 is thus held nonrotative, any forward rotation of the sun gear 270 will cause rearward rotation of the ring gear 286 and the vehicle will move rearwardly.

For all forward driving, the rod 358 is made to draw the hub 340 of the lever 324 forwardly, which pushes the carrier 288 rearwardly until the internal clutch teeth 312 slide over the teeth of the sun gear 270. The teeth of the planet pinions 294, being still meshed one third their length into the teeth of both the sun gear 270 and ring gear 286, a locked up condition is provided wherein the tail shaft 274 must rotate in unison with the transmission member 76.

These shifts are made when the vehicle is at rest and the accelerator pedal is fully released, for then no part of the transmission gearing is rotating.

Having set the manual control for either reverse or forward vehicle movement, such movement will begin as soon as the accelerator is again depressed, for then the valve 404 closes, and thereby cuts off the main clutch operating cylinders 106 from communication with the engine manifold 362 and opens them to the atmosphere through the bleeder slot 410. The main clutch 23 therefore always engages when the accelerator is depressed.

The other cylinders 108 are at all times connected to the engine manifold by the pipe 402, whereby the auxiliary clutch 25 is normally engaged when the engine is rotating, the degree of engagement depending on the extent of manifold vacuum. The booster gear comes into action only when the auxiliary clutch fails to carry the load directly, and the auxiliary clutch fails when the manifold vacuum fails.

Now it is well known that the degree of manifold vacuum depends on the two main factors, first, the extent to which the throttle valve 366 is open, and second, the speed at which the engine is rotating. If the throttle is very suddenly opened wide without giving the engine a chance to gain speed, the vacuum may decrease to something less than one pound below atmosphere. As the engine then gains speed, vacuum of four or five pounds may be had when the engine attains top speed even though the throttle is still wide open.

On the other hand if the throttle is opened very slowly, the vacuum may not drop below three or four pounds even though it will be opened wide by the time the engine reaches top speed. These facts have an important bearing on the operation of the booster gear.

If the operator desires the most rapid acceleration possible, he will require the booster gear to be in series with the underdrive ratio of the transmission gear. To get this condition he will depress the accelerator sharply, thereby dropping the manifold vacuum to a very low value, thereby lowering the engaging pressure on the auxiliary clutch plates to nearly zero, and at the same time increasing the force which the auxiliary clutch is called upon to transmit.

The immediate result is that the auxiliary clutch slips slightly, the members 52 and 80 and ring gear 101 try to roll the planet pinions on their studs to turn the sun gear 96 backwardly, the roller brake 99 stops backward rotation of the sun gear, and the planet pinion carrier 66 is rotated forwardly at three fifths engine speed. As soon as the gearing thus takes up the load, the helical teeth of the ring gear cause an axial thrust which forces the ring gear rearwardly, thereby lifting the clutch engaging arms 126 well off the plates 64, thereby giving the plates 62 and 72 plenty of space to spread apart to prevent drag, such spread apart condition being in effect as long as the booster gear is under load. The engine-to-wheel ratio is now 11.48 to 1.

Had the operator been satisfied with moderate acceleration he could have depressed the accelerator slowly so as to build up the vacuum in the manifold as fast as he increased the power to be transmitted and the auxiliary clutch would not have slipped, whereby the booster gear would not have become effective. The engine-to-wheel ratio would have been 6.88 to 1 or approximately that had in a conventional transmission mechanism when starting in second gear instead of low gear.

If the operator is accelerating in low gear, that is, with the booster gear and the underdrive ratio of the transmission gear in series, and reaches a speed of eight or ten M. P. H. he may preferably slack the pressure on the accelerator, which starts closing the throttle to increase the degree of vacuum in cylinder 108 and at the same time decreases the power to be transmitted and consequently the axial thrust of the ring gear 101. When he has slacked to an extent which allows the vacuum in cylinders 108 to overbalance the ring gear thrust, the arms 126 will move forward and cause the plates of the auxiliary clutch 25 to rub.

When the plates of the clutch 25 once rub they thereby carry part of the load, and such part of the load is removed from the booster gearing, which lessens the axial gear thrust, which allows more pressure on the plates by the arms, which causes the clutch to carry a still greater portion of the load, which in turn lessens the gear thrust, etc. until, in the matter of several seconds, all load has been returned to the auxiliary clutch and none is being carried by the booster gear.

The main shaft 70, which must always rotate forwardly at the speed of the booster gear carrier 66, drives the ring gear 174 of the transmission gear forwardly through the roller clutch 200. Since the sun gear 146 is permanently held non rotative, the shaft 70 revolves forwardly 1.474 turns to 1 turn of the transmission carrier 158, driving the output member 76 forwardly at the speed of the carrier 158 through the roller clutch 206. Under these conditions the roller clutches 214 and 242 merely overrun.

If the booster gear, which has a ratio of 1⅔ to 1 is now brought into action, the overall ratio through the device will be 1.474 × 1⅔ = 2.46 to 1. If the suggested 4⅔ to 1 axle is being used, the engine-to-wheel ratio will be 2.46 × 4⅔ = 11.48 to 1. This will be low gear. As soon as the vehicle resistance decreases sufficiently or acceleration has progressed to a suitable speed, the booster gear may be eliminated as before explained by slacking up on the accelerator which reduces the applied power and increases the vacuum which is holding the auxiliary clutch engaged. With the booster gear so eliminated the engine-to-wheel ratio will be 6.88 to 1, approximately the conventional second gear.

If, while the above condition maintains, the applied power is sufficiently reduced to cause the vehicle momentum to drive the engine, the transmission output member 76 will drive the ring gear 174 through the roller clutch 214, the ring gear will rotate the carrier through the planet pinions at 0.6784 carrier revolution to 1 ring gear revolution and the carrier will rotate the main shaft at carrier speed through the roller clutch 242. This is engine braking, that is, the prevention of free wheeling. The engine-to-wheel ratio for this braking is $4\tfrac{2}{3} \times 0.6784 = 3.16$ to 1. During this braking, the roller clutches 200 and 206 merely overrun.

When the above described engine braking takes place, that is, by driving the engine through the roller clutch 214, the springs 236 yield and allow the lugs 234 to move from over the lugs 238. If the vehicle speed is now anywhere above 17 M. P. H., the centrifugal weights 220 move out and engage the teeth 218 and complete a connection which will enable the ring gear 174 to drive the output member 76 forwardly, a condition which did not before exist.

It should be noted that the centrifugal weights 220 were not released to move out and make connection with the teeth 218 until the weights and the teeth were both revolving at the same speed.

If, after the connection between the weights 220 and teeth 218 is made, power is again applied, the drive will be from the main shaft 70, through the roller clutch 200 to the ring gear 174 and from the ring gear to the output member 76. The clutches 206 and 242 now overrun and 214 is dormant, the clutch 200 only driving at this time. The gearing now rotates idly under no load as does the countershaft of a conventional sliding gear transmission when in high gear. This is the direct drive connection through the transmission.

Whether or not this connection corresponds to high gear of a conventional transmission, will depend on whether the booster gear remains inactive or becomes active. At any speed up to about 35 M. P. H. when in the direct drive transmission ratio, a sharp depression of the accelerator pedal will bring in the booster gear in series with the 1 to 1 transmission gear and provide an overall ratio of 1.66, used preferably only momentarily while rapid acceleration to a still higher speed is desired.

If, after direct drive has thus been made effective in the transmission gear-set, the power is sufficiently decreased to allow the vehicle momentum to drive the engine, the engine braking drive will be from the output member 76 through weights 220 and teeth 218 to the ring gear which drives the carrier 158 through the planet pinions at 0.6784 times ring gear speed, and the carrier will rotate the main shaft through the roller clutch 242. The engine-to-wheel ratio for braking is again $$0.6784 \times 4\tfrac{2}{3} = 3.16 \text{ to } 1$$

During this engine braking, the clutch 242 only is driving, the clutch 214 being dormant and the clutches 200 and 206 overrunning.

When engine braking is made effective as above indicated, that is, by driving the engine through the roller clutch 242, the springs 264 yield and allow the lugs 262 to move from over the lugs 266. If the vehicle speed is now anywhere above 38 M. P. H. the centrifugal weights 248 move out and engage the teeth 246 and complete a connection which will enable the carrier 158 to drive the rotor shaft 70 forwardly, a condition which did not before exist. The centrifugal weights 248 were not unlocked for outward movement until the weights and teeth to be engaged by the weights were rotating at precisely the same speed.

If, after both the weights 220 and 248 have moved to their "out" position, power is again applied, the drive will be from the main shaft 70 through the weights 248 and teeth 246 to the carrier, the carrier driving the ring gear through the planet pinions at 1.474 revolutions of the ring gear to 1 of the carrier, and the ring gear driving the output member 76 through the weights 220 and teeth 218. The clutches 214 and 242 are now dormant and the clutches 200 and 206 overrun. This is the overdrive connection of the transmission gear-set, the output member revolutions being 1.474 times the input.

Whether or not this connection corresponds to overdrive of a conventional transmission, will depend on whether the booster gear remains inactive or becomes active. At any speed up to about 55 M. P. H. when in the overdrive transmission ratio, a sharp depression of the accelerator pedal will bring in the booster gear in series with the overdrive transmission gear and provide an overall ratio of 1.13, used preferably only momentarily while rapid acceleration to a still higher speed is desired.

If, during overdrive connection, engine braking takes place, the drive will be from the output member 76 through the weights 220 and teeth 218 to the ring gear 174 through the planet pinions 164 to the carrier 158 through the weights 248 and teeth 246 to the rotor shaft 70. The clutches 214 and 242 are dormant and the clutches 200 and 206 are overrunning.

It is not intended that the operator of a vehicle having the herein described transmission mechanism must necessarily pay any attention to the ratio in effect, because in normal driving, the power application is quite frequently varied unconsciously to an extent sufficient to cause the vehicle to drive the engine for an instant, and whenever this occurs, if the transmission gear-set is not connected for the most desirable ratio, the change to the most desirable ratio will take place without the operator's knowledge. Intermediate the time of the changes in the gearing the booster gear will operate to increase or reduce the overall ratio as speed and load conditions require.

Thus, at any time and with any transmission gear ratio effective, a reduction in ratio may be had through the booster gear by the application of heavy power against any heavy vehicle resistance if the engine speed has not at that time reached a value which is too near its maximum, in which case the engine could not increase its speed sufficiently to drive the vehicle at the then existing speed through any lower ratio.

The no-back feature of the mechanism is inherent without the addition of any parts, the arrangement of the roller clutches being such that no part in the transmission gear box may rotate backwardly.

Assuming the member 76 has rotated backwardly one turn. The carrier must then rotate backwardly one turn because of clutch 206. The ring gear must rotate backwardly 1.474 turns because of the planet pinions. But if the ring gear rotates backwardly 1.474 turns it must rotate the member 76 backwardly 1.474 turns because of the clutch 214. The member 76 can not rotate itself backwardly 1.474 turns by being rotated 1 turn. The mechanism therefore locks against backward rotation.

If the drive shaft or ring gear is urged to rotate backwardly the same situation as described above takes place because of the clutches 200 and 242. Backward rotation of the ring gear 174 one turn would rotate the rotor shaft 70 backwardly 1 turn because of the clutch 200. Backward rotation of the rotor shaft 70 one turn would rotate the carrier 158 backwardly one turn because of the clutch 242. But the ring gear and carrier are geared together to rotate in the ratio of 1.474 to 1 and can not both revolve one turn at the same time. The structure is therefore locked against backward rotation. It will be seen that the vehicle may move backwardly only when the reverse gear is set for backward rotation, in which case the tail shaft 274 rotates backwardly while the entire transmission gear-set rotates forwardly.

It has been stated that valve 404 operates upon release of the accelerator pedal to disengage the main clutch, but this is true only as long as the electrically controlled valve 412, which is in series with the valve 404, remains open. If the electrically controlled valve 412 once closes, then the main clutch remains engaged no matter what movement is given to valve 404 by the accelerator.

Since a conventional battery charging relay, such as 382, closes to begin battery charging at ten to twelve M. P. H. it follows that the coil 414, which is in series with the battery charging line 432—438, is energized at this speed and the valve 412 closes and prevents the main clutch being disengaged by release of the accelerator at any speed above ten to twelve M. P. H. When valve 412 closes, the bleeder slot 420 keeps the cylinders 106 connected to the atmosphere. This is important because there would be no gain in having made the transmission gear non free wheeling if clutch free wheeling were permitted.

For such drivers as prefer free wheeling, the electric switch 444 has been provided. If this switch is turned so as to connect point 450 to 446 and disconnect it from 442, then no charging current will pass through the coil 414 and the valve 412 will remain open at all speeds, whereby clutch free wheeling will be had at all speeds, being operative whenever the accelerator pedal is released.

The function of the valve 422 shown in Fig. 19, is to cause the auxiliary clutch 25 to disengage suddenly but to engage slowly. When this clutch disengages to allow the booster gear to take the load at any considerable vehicle speed, the engine must gain considerable in speed, relative to the vehicle, in order to make the gears take hold, and it is desirable that this gain take place without any clutch drag to be overcome by the engine.

On the other hand, when the auxiliary clutch engages for the elimination of the booster gear, the engine must be braked down to a lower speed by the clutch and it is therefore desirable to have this braking take place gradually so as to avoid noticeable engagement.

The valve 422 is therefore so made that the movement of air, by pressure differential, in at 398 and out at 400, for release of the auxiliary clutch, may take place rapidly, and movement in at 400 and out at 398 for engagement of the auxiliary clutch may take place slowly.

In a copending application Serial No. 180,174, filed Dec. 16, 1937, now issued as Patent No. 2,221,180, dated Nov. 12, 1940, there is shown a transmission gear and a reversing gear identical with that shown in this application. The new booster gear shown herein, however, so cooperates with the transmission and reversing gear as to require their inclusion in this application in order to show and describe a complete operative structure. The claims hereinafter presented will be confined to the booster gear and its control mechanism.

It is to be understood that, both in the specification and in the claims, the word vacuum is used loosely, meaning a partial reduction of the normal atmospheric pressure. When pounds vacuum is mentioned it is intended to mean the pounds reduction below normal atmospheric pressure.

I claim:

1. In combination, an internal combustion engine, a member rotatable by said engine at engine speed, a driven member, a clutch for drivably connecting said members, gearing automatically operative to drivably connect said members when said clutch yields to torque, means rotatable with said clutch and operative by engine intake manifold vacuum for holding said clutch engaged, and a throttle valve for increasing the manifold opening to the atmosphere thereby to increase the engine torque and decrease the manifold vacuum whereby the said clutch yields and said gearing becomes operative.

2. The combination with an internal combustion engine, having an intake manifold, of a member adapted to be rotated at engine speed, a driven member, a clutch for drivably connecting said members, gearing automatically operative to drivably connect said members when said clutch becomes disengaged, a vacuum motor carried by and rotatable with said engine speed member, means including a rotatable joint containing a passage connecting said rotating motor and manifold, linkage connecting said motor and clutch whereby said motor engages said clutch, and control means for altering the degree of vacuum in said manifold.

3. The combination with an internal combustion engine having an intake manifold, a throttle valve and an accelerator connected to said valve to open said valve to increase the engine power and decrease the manifold vacuum, of a member adapted to be driven at engine speed, a driven member, clutch means for connecting said members in one to one driving relation, gear means automatically operative to connect said members for reduced driven member speed when said clutch is disengaged, a vacuum motor carried by said engine speed member, means containing a passage connecting said motor and manifold, and torque means associated with said gearing operative by load thereon to oppose said motor engaging said clutch.

4. In combination, an internal combustion engine, a member rotatable by said engine at engine speed, a driven member, gearing through which said engine speed member rotates said driven member at reduced speed, a clutch for connecting said engine speed member and said driven member directly and thereby removing the torque load from said gearing, a vacuum motor carried by and rotatable with one member of said clutch for engaging said clutch, means connecting said motor and manifold, and a throttle valve operable to decrease the opening from the atmosphere into the intake manifold thereby to lower the engine torque and increase the manifold vacuum, whereby the said clutch engages and said gearing becomes inoperative.

5. The combination with an internal combustion engine, of power transmission mechanism comprising, a member drivably connected to the engine to rotate at engine speed, a driven member, a clutch for drivably connecting said members directly to rotate at the same speed, gearing for drivably connecting said members to rotate at different speeds only when said clutch yields to torque load and disengages, clutch operating means operable by engine manifold vacuum for holding the clutch engaged, a throttle valve for increasing the manifold opening to the atmosphere thereby to increase the engine torque and decrease the manifold vacuum, means containing a passageway connecting the manifold to the clutch operating means, and means in said passageway to permit air to move more freely from the manifold to the clutch operating means than from the clutch operating means to the manifold.

6. An internal combustion engine having power transmission mechanism comprising, a member rotated by and in unison with said engine, a driven member, a clutch for connecting said members in one to one driving relation, a gear on the engine rotated member, a reaction gear, a brake for holding said reaction gear against backward rotation, planet pinions on the driven member in mesh with both said gears, means operated by intake manifold vacuum for holding said clutch engaged, and torque means operative by and in proportion to the load carried by said gears opposing said vacuum means engaging said clutch.

7. An internal combustion engine having power transmission mechanism comprising, in combination, a member rotatable by and in unison with said engine, a driven member, a clutch for connecting said members in one to one driving relation, a gear on the engine rotated member, a reaction gear, a brake for holding said reaction gear against backward rotation, planet pinions on the driven member in mesh with both said gears, means energized by and in proportion to the intake manifold vacuum urging said clutch into engagement, and helical teeth on said gears operative to move one gear axially under load to oppose said vacuum means engaging said clutch.

8. The combination of an internal combustion engine and power transmission mechanism therefor comprising, a clutch member adapted to be rotated by said engine in one to one driving relation, a driven member, a second clutch member on the driven member adapted to engage the first said clutch member for one to one driving relation therebetween, a driving gear rotatable by and in unison with the first said clutch member, planet pinions on the driven member in mesh with the driving gear, a reaction gear in mesh with said planet pinions, a brake for holding said reaction gear against backward rotation, clutch operating means energized by and in proportion to the engine intake manifold vacuum urging engagement of the first with the second clutch members, and helical teeth on the driving gear causing it to move axially under load to overcome said clutch engaging means.

9. An internal combustion engine with power transmission mechanism comprising, in combination, a friction clutch member adapted to be connected for one to one rotation by said engine, a driven member, a second friction clutch member on the driven member adapted to be pressed into engagement with the first friction clutch member for one to one rotation, an axially movable ring gear secured to the first friction clutch member for one to one rotation therewith, planet pinions on the driven member in mesh with said ring gear, a reaction gear, a brake for holding said reaction gear against backward rotation, clutch operating means energized by and in proportion to the degree of vacuum in the engine manifold for pressing said friction clutch members into engagement, and helical teeth on the ring gear operative to move it axially under load to overcome said clutch operating means and allow said friction clutch members to disengage.

10. An internal combustion engine with power transmission mechanism comprising, in combination, a friction clutch member adapted to be revolved by the engine in one to one driving relation, a driven member, a second friction clutch member on the driven member engageable with the first said clutch member, a ring gear splinedly mounted on the first said friction clutch member for rotation therewith but having axial movement with respect thereto, planet pinions carried by the driven member in mesh with said ring gear, a sun gear, a one way brake for arresting backward rotation of said sun gear, a clutch engaging means energized by and in proportion to the degree of vacuum in the engine intake manifold for pressing said friction clutch members together for one to one driving relation, and helical teeth on the ring gear angled to urge said ring gear axially in proportion to the torque load carried thereby and against the force of said clutch engaging means.

11. In combination, an internal combustion engine having an intake manifold, a member adapted to be revolved by said engine, friction means on said member, a driven member, friction means on the driven member positioned to be pressed together with the first said friction means, a driving gear secured for rotation with the first said member, planet pinions carried by said driven member in mesh with said driving gear, a reaction gear in mesh with said planet pinions, a brake for holding said reaction gear against rotation, a vacuum motor carried on the first said member and connected to said manifold and operative to press together the first and second friction means, and torque responsive means on the driving gear operative under load to oppose and overcome said vacuum motor.

12. In combination, an internal combustion engine having an intake manifold, a member adapted to be revolved by said engine at engine speed, friction means on said member, a driven member, friction means on the driven member positioned to be pressed together with the first said friction means, an axially movable driving gear secured for rotation with the first said member, planet pinions carried by the driven member in mesh with said driving gear, a reaction gear in mesh with said planet pinions, means for holding said reaction gear against rotation, a vacuum motor carried on the first said member, means containing an air passage connecting said manifold and motor, lever means connecting said motor and driving gear, whereby said motor may move said driving gear axially in one direction, means moved by said axial movement to press together said first and second friction means, and torque means on said driving gear operative under load to move said gear axially in the other direction to oppose and overcome said motor.

13. The combination with an internal combustion engine having an intake manifold, a throttle, and an accelerator for opening said throttle whereby the manifold vacuum is decreased and the engine power increased, of a member adapted to be rotated by the engine at engine speed, friction means on said member, a driven member, friction means on said driven member adapted to be frictionally engaged with the first said friction member, a ring gear splinedly mounted on the engine speed member, planet pinions on the driven member in mesh with said ring gear, a sun gear in mesh with said planet pinions, a one way brake for holding said sun gear against backward rotation, a vacuum motor on the engine speed member, a pipe connecting the intake manifold to the vacuum motor, lever means connecting said motor and ring gear whereby the application of vacuum to said motor may move said ring gear axially in one direction, means on said ring gear to press the first and second friction means together when so moved axially, and helical teeth on said ring gear operative under load to force said ring gear axially in the other direction.

14. Power transmission mechanism comprising, a driving clutch element, a driven clutch element, an intermediate element having clutch means engageable with both said clutch elements, gear means for drivably connecting the intermediate and driven clutch elements, and vacuum clutch operating mechanism carried on the intermediate element for controlling engagement of the driving and intermediate clutch elements and the intermediate and driven clutch elements.

15. Power transmission mechanism comprising, a driving member, a driven member, an intermediate member, clutch means for connecting the driving and intermediate members, a second clutch means for connecting the intermediate and driven members, gear means for drivably connecting the intermediate and driven members when said second clutch means becomes disengaged, and two air actuated mechanisms on the intermediate member one for holding the first clutch means disengaged and the other for holding the second clutch means engaged.

16. In combination, an internal combustion engine, a driving element secured for rotation with said engine, an intermediate element, a driven element, clutch means for connecting the intermediate and driving elements, a second clutch means for connecting the intermediate and driven elements, gear means for drivably connecting the intermediate and driven elements when said second clutch means is disengaged, means rotatable with a part of the first clutch operated by engine suction operative, when applied, to disengage the first clutch means, and means rotatable with a part of the first clutch operated by engine suction operative, when applied, to engage said second clutch means.

17. The combination with an internal combustion engine, of a driving member secured for rotation with said engine, an intermediate member, a driven member, clutch means for connecting the driving and intermediate members, a second clutch means for connecting the intermediate and driven members, vacuum clutch operating means carried on the intermediate member, gear means for drivably connecting the intermediate and driven members when said second clutch means is disengaged, an engine accelerator, valve mechanism operative upon release of said accelerator to operate said vacuum means to disengage the first clutch means and a second vacuum clutch operating means carried on the intermediate member operative to engage the second clutch means upon release of said accelerator.

18. A power transmitting mechanism for an internal combustion engine comprising, a driving member rotatable in unison with said engine, an intermediate member, a driven member, clutch means for connecting the driving and intermediate members, a second clutch means for connecting the intermediate and driven members, vacuum clutch operating means carried on the intermediate member, gear means for drivably connecting the intermediate and driven members when said second clutch means is disengaged, an engine accelerator, and valve mechanism operative by depression of said accelerator to control said vacuum clutch operating means to engage the first clutch means and disengage the second clutch means.

19. The combination with an internal combustion engine having an intake manifold, a throttle, an accelerator for opening said throttle, whereby the engine power is increased and the manifold vacuum decreased, a generator, a battery, and a battery charging relay, of a member permanently secured for rotation with said engine, a second member, a clutch for connecting said members, a vacuum motor operable to disengage said clutch, means containing an air passage from said manifold to said motor, a valve in said passage connected to, and openable by release of, said accelerator, a second valve in said passage, coil wound electromagnetic means magnetizable to close said second valve, connecting means connecting said relay to said coil, and a manually operable switch for selectively connecting said relay to said battery either through said coil or around said coil.

20. The combination with an internal combustion engine having an intake manifold, a throttle, an accelerator for opening said throttle, whereby the engine power is increased and the manifold vacuum decreased, an electric generator, an electric battery, and a battery charging relay, of an intermediate member, a clutch for connecting the engine to the intermediate member, a driven member, a second clutch for connecting the intermediate member to the driven member, gearing for automatically connecting the intermediate member to the driven member when said second clutch becomes disengaged, a first vacuum means for disengaging the first clutch, a second vacuum means for engaging the second clutch, a first conduit from the manifold to the first vacuum means, a second conduit from the manifold to the second vacuum means, two normally open valves in series in the first conduit, the one closable by operation of the accelerator to open the throttle and the other closable electrically by closing the said relay, and valve means in the second conduit for restricting air flow into the manifold but allowing free passage of air from the manifold.

FREDERICK W. COTTERMAN.

CERTIFICATE OF CORRECTION.

Patent No. 2,266,740.　　　　　　　　　　　　　　　December 23, 1941.

FREDERICK W. COTTERMAN.

It is hereby certified that error appears in the printed specification of the above numbered patent requiring correction as follows: Page 3, second column, line 13, for "143" read --142--; line 15, for "142" read --143--; page 11, second column, line 43, claim 19, for "connecting" read --conducting--; and that the said Letters Patent should be read with this correction therein that the same may conform to the record of the case in the Patent Office.

Signed and sealed this 3rd day of March, A. D. 1942.

(Seal)　　　　　　　　　　　　　　　　　　　　　　Henry Van Arsdale,
　　　　　　　　　　　　　　　　　　　　　　　　Acting Commissioner of Patents.